United States Patent
Hsiao

(10) Patent No.: US 11,611,127 B2
(45) Date of Patent: Mar. 21, 2023

(54) SUPPORTING BASE AND RELIEF VALVE

(71) Applicants: Inventec (Pudong) Technology Corporation, Shanghai (CN); INVENTEC CORPORATION, Taipei (TW)

(72) Inventor: Chi-Cheng Hsiao, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 162 days.

(21) Appl. No.: 17/117,420

(22) Filed: Dec. 10, 2020

(65) Prior Publication Data

US 2022/0069410 A1    Mar. 3, 2022

(30) Foreign Application Priority Data

Aug. 31, 2020 (CN) .......................... 202010894061.2

(51) Int. Cl.
*H01M 50/333* (2021.01)
*B60L 3/00* (2019.01)
*H01M 10/052* (2010.01)
*H01M 10/42* (2006.01)
*H01M 50/249* (2021.01)

(52) U.S. Cl.
CPC ......... *H01M 50/333* (2021.01); *B60L 3/0046* (2013.01); *H01M 10/052* (2013.01); *H01M 10/425* (2013.01); *H01M 50/249* (2021.01); *H01M 2200/20* (2013.01); *H01M 2220/20* (2013.01)

(58) Field of Classification Search
None
See application file for complete search history.

(56) References Cited

U.S. PATENT DOCUMENTS

2010/0047673 A1* 2/2010 Hirakawa ........... H01M 50/289
429/57

* cited by examiner

*Primary Examiner* — Carmen V Lyles-Irving
(74) *Attorney, Agent, or Firm* — Locke Lord LLP; Tim Tingkang Xia, Esq.

(57) ABSTRACT

A supporting base and a relief valve. Relief valve includes valve body, restoring component and plug. Valve body includes first cover plate and first side wall. First cover plate and first side wall together form opening. First side wall includes pressure releasing hole. Vent of casing is connected to opening. Pressure releasing hole is connected to opening. Plug includes second cover plate and second side wall. Second side wall and second cover plate together form recession. Recession is connected to accommodation space via vent. Second cover plate is movably disposed in opening via restoring component. When plug is in initial position, pressure releasing hole is disconnected from accommodation space. When plug is in releasing position, pressure releasing hole is connected to accommodation space via vent.

9 Claims, 4 Drawing Sheets

SUPPORTING BASE AND RELIEF VALVE

CROSS-REFERENCE TO RELATED APPLICATIONS

This non-provisional application claims priority under 35 U.S.C. § 119(a) on Patent Application No(s). 202010894061.2 filed in China, on Aug. 31, 2020, the entire contents of which are hereby incorporated by reference.

BACKGROUND OF THE INVENTION

Technical Field of the Invention

The invention relates to a supporting base and a relief valve, more particularly to a supporting base and a relief valve including a pressure releasing hole.

Description of the Related Art

Electric vehicle is a transportation that has a battery pack that powers a motor and can be charged through an electrical outlet. A rapid temperature increase of the battery pack can occur due to sudden impact, short-circuiting, or overcharging.

When the battery pack can no longer withstand the high temperature, it may explode. The battery explosion may be accompanied by the release of toxic gas, fire, jet flames, resulting in serious injury or death. To prevent this from happening, most of battery packs have one or more relief valves for releasing the pressure caused by the explosion. The typical pressure relief valves catch the explosion airflow with a protruding surface of a plug thereon. However, the explosion airflow goes in all directions so that the pressure on the plug is uneven and may lead to malfunction.

SUMMARY OF THE INVENTION

The invention is to provide a supporting base and a relief valve ensuring the function of the relief valve when catching airflows of various directions.

One embodiment of this invention provides a supporting base configured to accommodate a battery and a control circuit board and including a casing and a relief valve. The casing includes an accommodation space and a vent. The vent is connected to the accommodation space. The battery and the control circuit board are configured to be accommodated in the accommodation space. The relief valve includes a valve body, a restoring component and a plug. The valve body includes a first cover plate and a first side wall. The first side wall protrudes from the first cover plate and is fixed to the casing. The first cover plate and the first side wall together form an opening. The first side wall includes a pressure releasing hole, and the pressure releasing hole is connected to an outer space. The vent of the casing is connected to the opening. The pressure releasing hole is connected to the opening. The restoring component is connected to the opening. The plug includes a second cover plate and a second side wall. The second side wall protrudes from the second cover plate and rests on the first side wall of the valve body. The second side wall and the second cover plate together form a recession. The recession is connected to the accommodation space via the vent. The second cover plate is movably disposed in the opening via the restoring component so as to includes an initial position and a releasing position. When the plug is in the initial position, the second side wall of the plug covers the pressure releasing hole of the first side wall so that the pressure releasing hole is disconnected from the accommodation space, and the recession is disconnected from the outer space. When the plug is pushed to be in the releasing position, the second side wall of the plug is moved away from the pressure releasing hole of the first side wall so that the pressure releasing hole is connected to the recession and the accommodation space via the vent. The restoring component is configured to restore the plug from the releasing position back to the initial position.

Another embodiment of this invention provides a relief valve configured to be fixed to a casing comprising an accommodation space and including a valve body, a restoring component and a plug. The valve body includes a first cover plate and a first side wall. The first side wall protrudes from the first cover plate. The first cover plate and the first side wall together form an opening. The first side wall includes a pressure releasing hole. The pressure releasing hole is connected to the opening. The restoring component is connected to the opening. The plug includes a second cover plate and a second side wall. The second side wall protrudes from the second cover plate and rests on the first side wall. The second side wall and the second cover plate together form a recession. The recession is connected to the accommodation space. The second cover plate is movably disposed in the opening via the restoring component so as to include an initial position and a releasing position. When the plug is in the initial position, the second side wall of the plug covers the pressure releasing hole of the first side wall so that the pressure releasing hole is disconnected from the accommodation space. When the plug is in the releasing position, the second side wall of the plug is moved away from the pressure releasing hole of the first side wall so that the pressure releasing hole is connected to the accommodation space.

According to the supporting base and the relief valve disclosed by the above embodiments, since the second side wall and the second cover plate of the plug together form the recession and the second side wall rests on the first side wall, the explosion airflow from the battery to the recession can evenly push the second cover plate of the plug. Also, the first side wall of the valve body can support the second side wall of the plug to prevent it from being inclined relative to the valve body by the second explosion airflow. As such, the explosion airflow of various directions will be evenly distributed on the plug of the relief valve, such that the function of the relief valve is secured.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1:
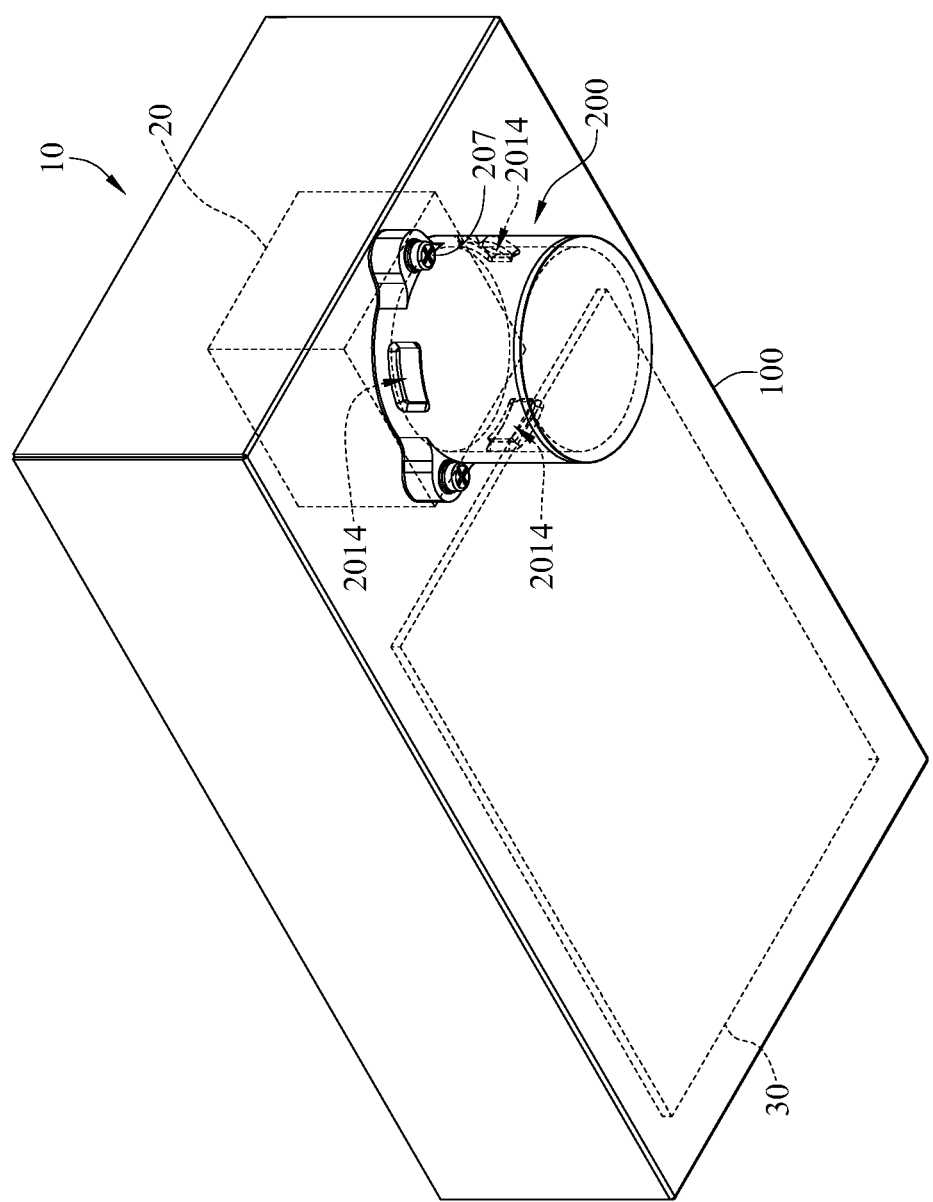
FIG. 1 is a perspective view of a battery, a control circuit board, and a supporting base according to one embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
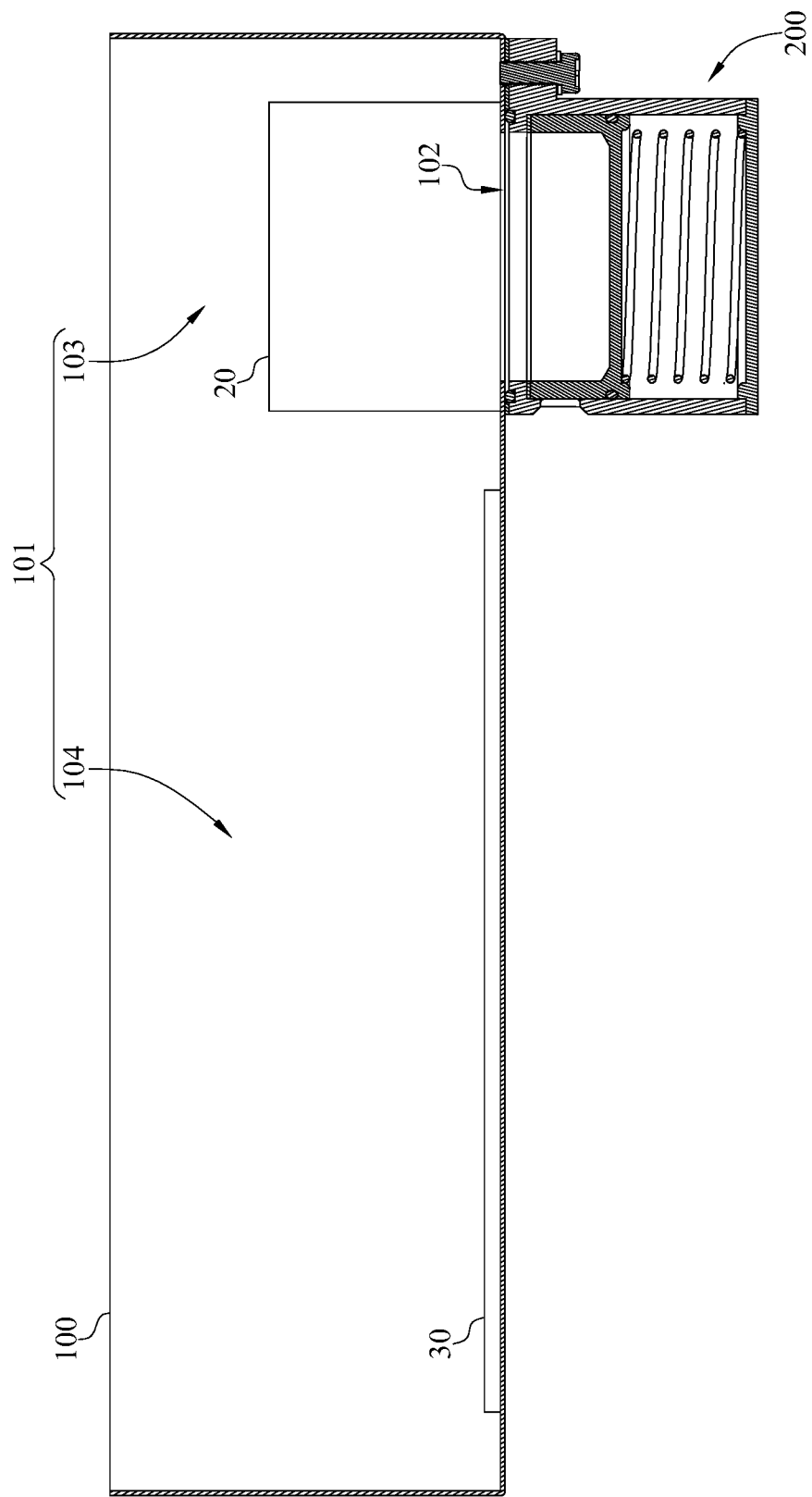
FIG. 2 is a cross-sectional view of the battery, the control circuit board and the supporting base in FIG. 1.
Figure 3:
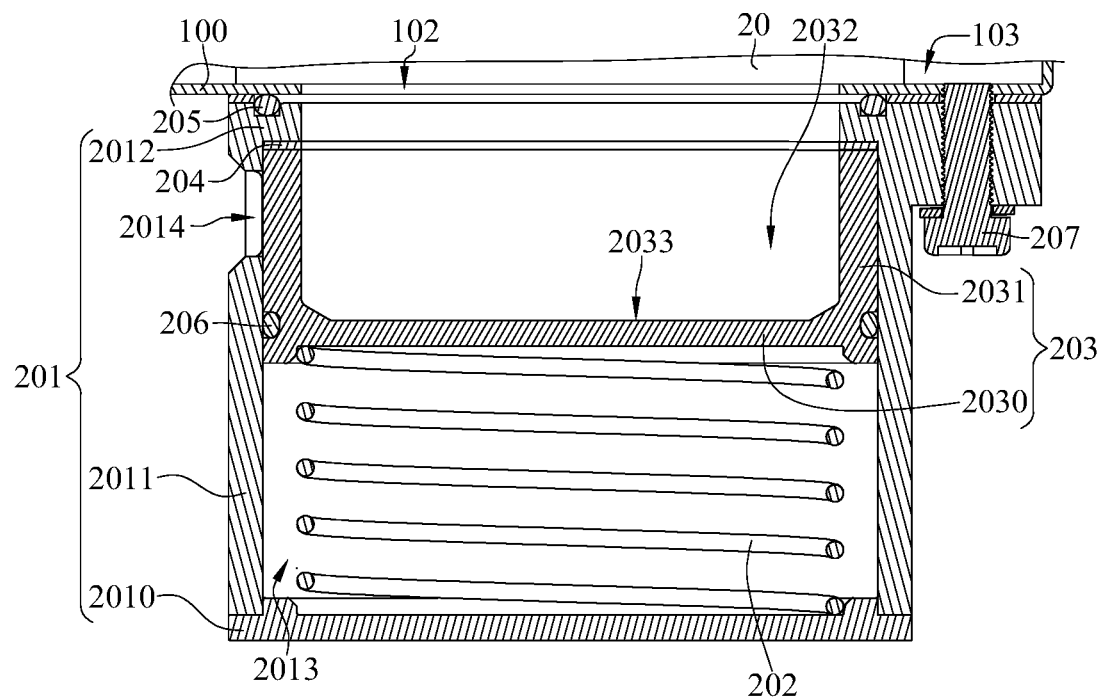
FIG. 3 is a partially enlarged cross-sectional view showing that a plug of the supporting base in FIG. 1 is in an initial position.

Please refer to FIG. 1 to FIG. 3, where FIG. 1 is a perspective view of a battery 20, a control circuit board 30 and a supporting base 10 according to one embodiment of the invention, FIG. 2 is a cross-sectional view of the battery 20, the control circuit board 30 and the supporting base 10 in FIG. 1, and FIG. 3 is a partially enlarged cross-sectional view showing that a plug 203 of the supporting base 10 in FIG. 1 is in an initial position.

In this embodiment, the supporting base 10 is configured to accommodate the battery 20 and the control circuit board 30. The supporting base 10 includes a casing 100 and a relief valve 200. The battery 20 is, for example, a Lithium battery. The supporting base 10 is configured to be disposed on, for example, a frame of an electric vehicle.

In this embodiment, the casing 100 includes an accommodation space 101 and a vent 102. Also, in this embodiment, the accommodation space 101 includes a first accommodation space 103 and a second accommodation space 104 that are arranged side by side. The vent 102 is connected to the first accommodation space 103. The battery 20 is configured to be accommodated in the first accommodation space 103. The control circuit board 30 is configured to be accommodated in the second accommodation space 104. In other embodiments, in a case that the second accommodation space is connected to the first accommodation space, the vent may be connected to the second accommodation space.

In this embodiment, the relief valve 200 includes a valve body 201, a restoring component 202, the plug 203, a first seal ring 204, a second seal ring 205, and a third seal ring 206. In this embodiment, the valve body 201 includes a first cover plate 2010, a first side wall 2011 and a protruding plate 2012. The first side wall 2011 protrudes from the first cover plate 2010 and is fixed to the casing 100. The first cover plate 2010 and the first side wall 2011 together form an opening 2013. The vent 102 of the casing 100 is connected to the opening 2013. Further, the first side wall 2011 includes three pressure releasing holes 2014 that are connected to the opening 2013. Moreover, in this embodiment, the relief valve 200 further includes a plurality of screws 207. The first side wall 2011 is fixed to the casing 100 via the screws 207, but the invention is not limited thereto. In other embodiments, the first side wall may be fixed to the casing via a rivet or other types of fasteners. The protruding plate 2012 protrudes from the first side wall 2011 and is located in the opening 2013.

In this embodiment, the restoring component 202 is, for example, a compression spring. The restoring component 202 is located in the opening 2013 and an end of the restoring component 202 is fixed to the first cover plate 2010 of the valve body 201.

In this embodiment, the plug 203 includes a second cover plate 2030 and a second side wall 2031. The second side wall 2031 protrudes from the second cover plate 2030 and rests on the first side wall 2011 of the valve body 201. The second side wall 2031 and the second cover plate 2030 together form a recession 2032 that is connected to the first accommodation space 103 via the vent 102. In addition, the second cover plate 2030 includes a bottom surface 2033 that is located in the recession 2032. In this embodiment, the bottom surface 2033 faces the vent 102 of the casing 100. Another end of the restoring component 202 is fixed to the second cover plate 2030 of the plug 203. That is, two opposite ends of the restoring component 202 are respectively fixed to the first cover plate 2010 of the valve body 201 and the second cover plate 2030 of the plug 203, such that the second cover plate 2030 is movably disposed in the opening 2013 via the restoring component 202 and thus the plug 203 includes the initial position and a releasing position. In other words, the plug 203 is switchable between the initial position and the releasing position. Moreover, in this embodiment, the protruding plate 2012 is located on a side of the second side wall 2031 that is located away from the second cover plate 2030 so that the movement of the second side wall 2031 is restricted by the protruding plate 2012. However, in other embodiments, the valve body may not include the protruding plate, and an engagement hole of the first side wall may be engaged with a protrusion on the second side wall so that the movement of the second side wall is restricted.

In this embodiment, the first seal ring 204 is disposed on a side of the protruding plate 2012 that is located close to the second cover plate 2030 of the plug 203.

In this embodiment, the second seal ring 205 is clamped by the first side wall 2011 of the valve body 201 and the casing 100, and is spaced apart from the opening 2013. As such, the second seal ring 205 can improve the airtightness between the first side wall 2011 of the valve body 201 and the casing 100. In other embodiments, when the airtightness between the first side wall and the casing already meets the actual requirements, the relief valve may omit the second seal ring.

In this embodiment, the third seal ring 206 is clamped by the first side wall 2011 of the valve body 201 and the second side wall 2031 of the plug 203, and is spaced apart from the pressure releasing holes 2014 of the first side wall 2011. As such, the third seal ring 206 can improve the airtightness between the first side wall 2011 of the valve body 201 and the second side wall 2031 of the plug 203. In other embodiments, when the airtightness between the first side wall and the second side wall already meets the actual requirements, the relief valve may omit the third seal ring.

As shown in FIG. 3, the battery 20 is functional, and the plug 203 is kept in the initial position by the restoring component 202. When the plug 203 is in the initial position, the second side wall 2031 of the plug 203 covers the pressure releasing holes 2014 of the first side wall 2011, such that the pressure releasing holes 2014 is disconnected from the first accommodation space 103. In addition, when the plug 203 is in the initial position, the first seal ring 204 is clamped by the protruding plate 2012 and the second side wall 2031 of the plug 203 so as to ensure the airtightness between the protruding plate 2012 and the second side wall 2031 of the plug 203. In other embodiments, when the airtightness between the protruding plate and the second side wall already meets the actual requirements, the relief valve may omit the first seal ring.

Figure 4:
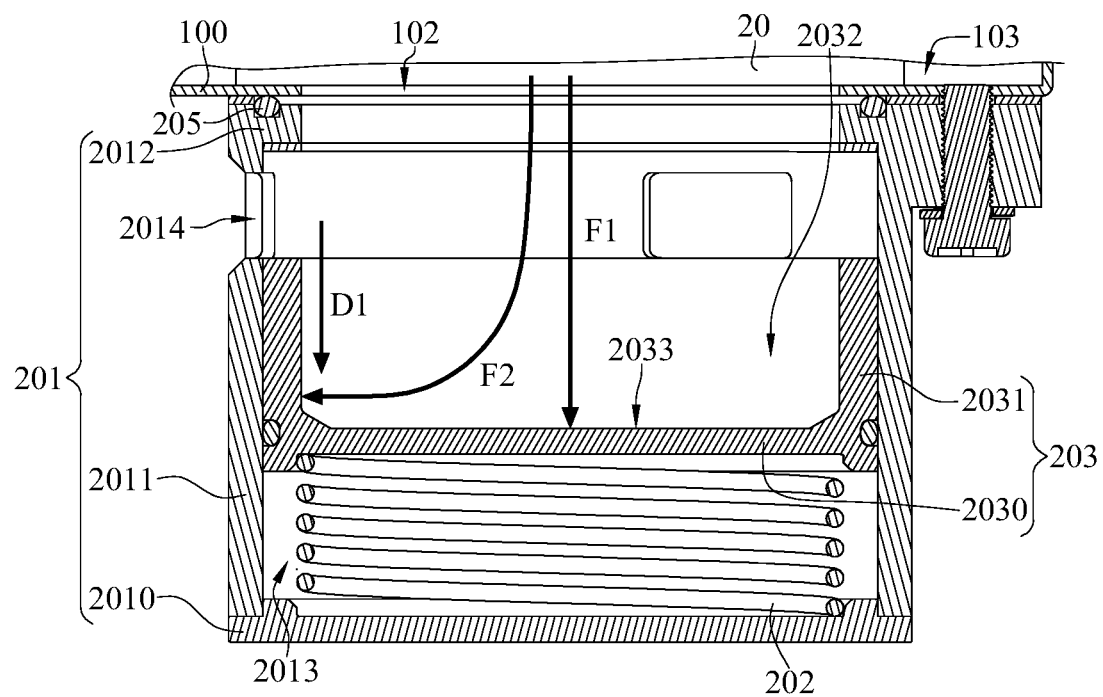
FIG. 4 is a partially enlarged cross-sectional view showing that the plug of the supporting base in FIG. 1 is in a releasing position.

Please refer to FIG. 4, there is shown a partially enlarged cross-sectional view showing that the plug of the supporting base in FIG. 1 is in a releasing position. In specific, FIG. 4 is to illustrate the situation when the battery 20 explodes. As shown, a first explosion airflow F1 and a second explosion airflow F2 are generated, the first explosion airflow F1 and the second explosion airflow F2 flow into the recession 2032 of the plug 203 from the first accommodation space 103 where the battery 20 accommodated via the vent 102 and force the plug 203. The pressure of the first explosion airflow F1 and the second explosion airflow F2 on the plug 203 compresses the restoring component 202, such that the plug 203 is moved towards the releasing position along a releasing direction D1. More specifically, the first explosion airflow F1 flows towards the bottom surface 2033 of the second cover plate 2030 of the plug 203, and the second explosion airflow F2 flows towards the second sidewall 2031 of the plug 203. When the plug 203 is in the releasing position, the second side wall 2031 of the plug 203 is moved away from the pressure releasing holes 2014 of the first side wall 2011 of the valve body 201 so that the pressure releasing holes 2014 are exposed to and connected to the first accommodation space 103 via the vent 102. In this way, the first explosion airflow F1 and the second explosion airflow F2 flowing through the vent 102 can then flow through the pressure releasing holes 2014, thereby reducing the pressure in the supporting base 10. As discussed, the first side wall 2011 has three pressure releasing holes 2014, such that the first explosion airflow F1 and the second explosion airflow F2 can flow out of the plug 203 in a uniform manner. It is noted that in other embodiments, the first side wall may include only one, two, or more than four pressure releasing holes as long as the explosion airflows can be evenly and effectively discharged to the outside. In addition, when the plug 203 is in the releasing position, the restoring component 202 is compressed. When the generation of the first explosion airflow F1 and the second explosion airflow F2 is stopped, the restoring component 202 can release the stored elastic energy to restore the plug 203 back to the initial position.

In addition, as shown, the bottom surface 2033 of the second cover plate 2030 of the plug 203 (i.e., the bottom of the recession 2032) faces towards the vent 102, which helps the first explosion airflow F1 to be evenly distributed on the second cover plate 2030 of the plug 203. Moreover, the first side wall 2011 of the valve body 201 can supports the second side wall 2031 of the plug 203 to prevent it from being inclined relative to the valve body 201 by the second explosion airflow F2. It is noted that in other embodiments, as long as the second cover plate of the plug can be pushed by explosion airflows in a uniform manner, the bottom surface of the second cover plate may not face towards the vent.

Figure 5:
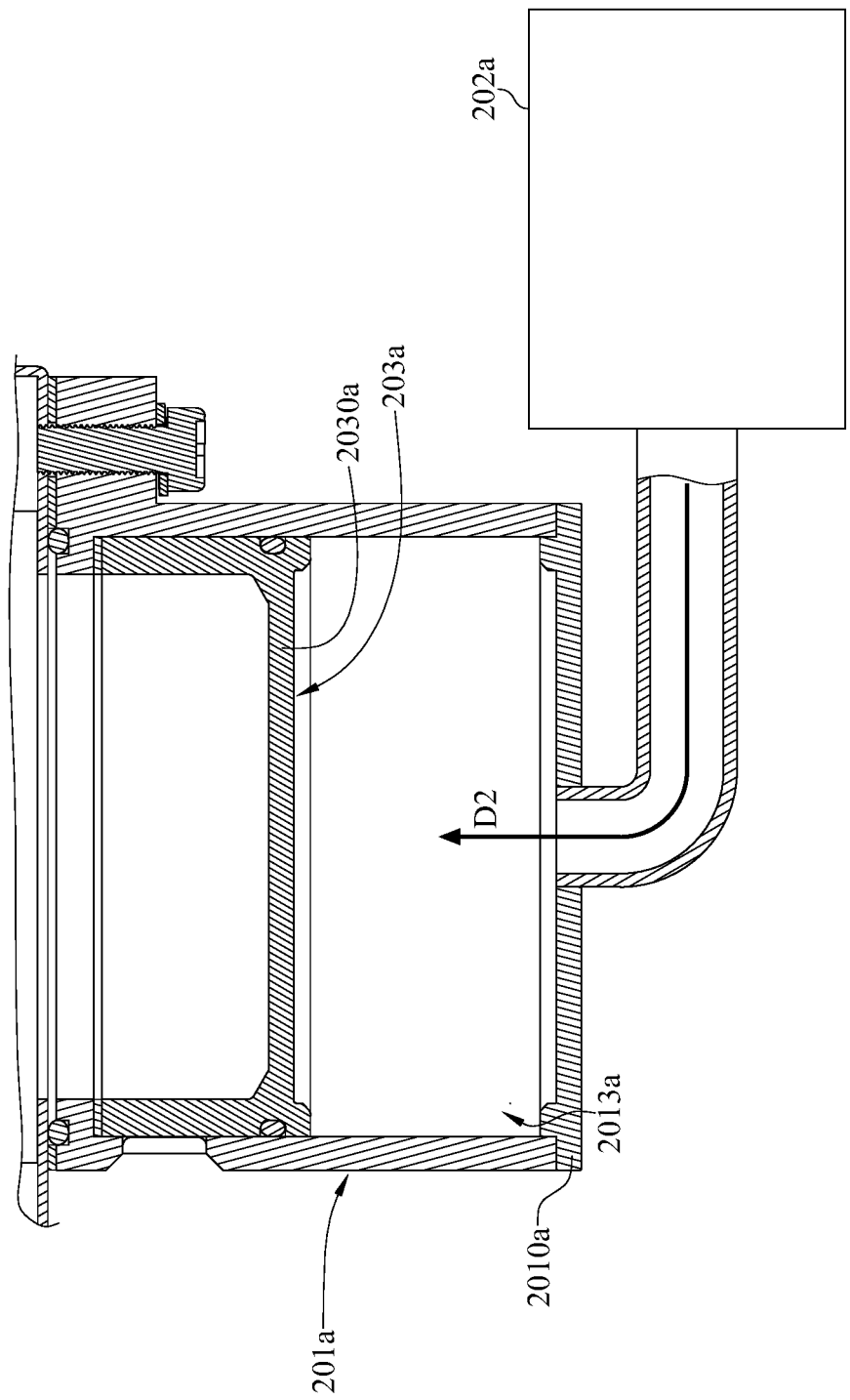
FIG. 5 is a partially enlarged cross-sectional view showing that a plug of a supporting base according to another embodiment of the invention is in an initial position.

Additionally, any suitable means that can restore the plug can be served as the restoring component of the invention. Please refer to FIG. 5, there is shown a partially enlarged cross-sectional view showing that a plug of a supporting base according to another embodiment of the invention is in an initial position. In this embodiment, the restoring component 202a is, for example, a fluid supply unit. The restoring component 202a is configured to supply a fluid into the opening 2013a along an injecting direction D2. The fluid will exist between the first cover plate 2010a of the valve body 201a and the second cover plate 2030a of the plug 203a to push the second cover plate 2030a of the plug 203a away from the first cover plate 2010a of the valve body 201a or to kept the position of the second cover plate 2030a with respect to the first cover plate 2010a.

In one embodiment of the invention, the technique disclosed by the invention can be applied to vehicles, such as autonomous vehicles (AV), electric vehicles, or a vehicle equipped with an advanced driver assistance systems (ADAS).

According to the supporting base and the relief valve disclosed by the above embodiments, since the second side wall and the second cover plate of the plug together form the recession and the second side wall rests on the first side wall, the explosion airflow from the battery to the recession can evenly push the second cover plate of the plug. Also, the first side wall of the valve body can support the second side wall of the plug to prevent it from being inclined relative to the valve body by the second explosion airflow. As such, the explosion airflow of various directions will be evenly distributed on the plug of the relief valve, such that the function of the relief valve is secured.

It will be apparent to those skilled in the art that various modifications and variations can be made to the present invention. It is intended that the specification and examples be considered as exemplary embodiments only, with a scope of the invention being indicated by the following claims and their equivalents.

What is claimed is:

1. A supporting base, configured to accommodate a battery and a control circuit board, the supporting base comprising:
   a casing, the casing comprising an accommodation space and a vent, the vent connected to the accommodation space, and the battery and the control circuit board configured to be accommodated in the accommodation space; and
   a relief valve, the relief valve comprising:
      a valve body, the valve body comprising a first cover plate and a first side wall, the first side wall protruding from the first cover plate and fixed to the casing, the first cover plate and the first side wall together forming an opening, the first side wall comprising a pressure releasing hole, the pressure releasing hole connected to an outer space, the vent of the casing connected to the opening, the pressure releasing hole connected to the opening;
      a restoring component, the restoring component connected to the opening; and
      a plug, the plug comprising a second cover plate and a second side wall, wherein the second side wall protrudes from the second cover plate and rests on the first side wall of the valve body, the second side wall and the second cover plate together form a recession, the recession is connected to the accommodation space via the vent, the second cover plate is movably disposed in the opening via the restoring component so as to comprise an initial position and a releasing position;
   wherein, when the plug is in the initial position, the second side wall of the plug covers the pressure releasing hole of the first side wall so that the pressure releasing hole is disconnected from the accommodation space, and the recession is disconnected from the outer space, when the plug is pushed to be in the releasing position, the second side wall of the plug is moved away from the pressure releasing hole of the first side wall so that the pressure releasing hole is connected to the recession and the accommodation space via the vent, and the restoring component is configured to restore the plug from the releasing position back to the initial position;
   wherein the relief valve further comprises a seal ring, and the seal ring is clamped by the first side wall of the valve body and the second side wall of the plug and is spaced apart from the pressure releasing hole of the first side wall.

2. The supporting base according to claim 1, wherein the restoring component is a compression spring, and two opposite ends of the restoring component are fixed to the first cover plate of the valve body and the second cover plate of the plug, respectively.

3. The supporting base according to claim 1, wherein the restoring component is a fluid supply unit, the restoring component is configured to supply a fluid into the opening to force the fluid to exist between the first cover plate of the valve body and the second cover plate of the plug and to push the second cover plate of the plug away from the first cover plate of the valve body.

4. The supporting base according to claim 1, wherein the second cover plate of the plug comprises a bottom surface, and the bottom surface is located in the recession and faces towards the vent of the casing.

5. The supporting base according to claim 1, wherein the valve body further comprises a protruding plate, the protruding plate protrudes from the first side wall and is located in the opening, and when the plug is in the initial position, the protruding plate is located on a side of the second side wall of the plug that is located away from the second cover plate.

6. The supporting base according to claim 5, wherein the relief valve further comprises a seal ring, the seal ring is disposed on a side of the protruding plate that is located close to the second cover plate, and when the plug is in the initial position, the seal ring is clamped by the protruding plate and the second side wall of the plug.

7. The supporting base according to claim 1, wherein the relief valve further comprises a seal ring, and the seal ring is clamped by the first side wall of the valve body and the casing and is spaced apart from the opening.

8. The supporting base according to claim 1, wherein the accommodation space of the casing comprises a first accommodation space and a second accommodation space, the first accommodation space and the second accommodation space are arranged side by side, the first accommodation space is configured to accommodate the battery, the first accommodation space is connected to the vent, and the second accommodation space is configured to accommodate the control circuit board.

9. A relief valve, configured to be fixed to a casing comprising an accommodation space, the relief valve comprising:
a valve body, the valve body comprising a first cover plate and a first side wall, the first side wall protruding from the first cover plate, the first cover plate and the first side wall together forming an opening, the first side wall comprising a pressure releasing hole, the pressure releasing hole connected to an outer space, the pressure releasing hole connected to the opening;
a restoring component, the restoring component connected to the opening; and
a plug, the plug comprising a second cover plate and a second side wall, wherein the second side wall protrudes from the second cover plate and rests on the first side wall, the second side wall and the second cover plate together form a recession, the recession is connected to the accommodation space, the second cover plate is movably disposed in the opening via the restoring component so as to comprise an initial position and a releasing position;
wherein, when the plug is in the initial position, the second side wall of the plug covers the pressure releasing hole of the first side wall so that the pressure releasing hole is disconnected from the accommodation space, and the recession is disconnected from the outer space, when the plug is in the releasing position, the second side wall of the plug is moved away from the pressure releasing hole of the first side wall so that the pressure releasing hole is connected to the recession and the accommodation space;
wherein the relief valve further comprises a seal ring, and the seal ring is clamped by the first side wall of the valve body and the second side wall of the plug and is spaced apart from the pressure releasing hole of the first side wall.

* * * * *